United States Patent
Mukaide et al.

(10) Patent No.: US 8,375,417 B2
(45) Date of Patent: *Feb. 12, 2013

(54) AUDIOVISUAL (AV) DEVICE AND CONTROL METHOD THEREOF

(75) Inventors: Takanobu Mukaide, Tachikawa (JP); Masahiko Mawatari, Yokohama (JP)

(73) Assignee: Kabushiki Kaisha Toshiba, Tokyo (JP)

(*) Notice: Subject to any disclaimer, the term of this patent is extended or adjusted under 35 U.S.C. 154(b) by 327 days.

This patent is subject to a terminal disclaimer.

(21) Appl. No.: 12/497,338

(22) Filed: Jul. 2, 2009

(65) Prior Publication Data

US 2009/0269037 A1     Oct. 29, 2009

Related U.S. Application Data

(62) Division of application No. 11/603,845, filed on Nov. 22, 2006.

(30) Foreign Application Priority Data

Mar. 29, 2006    (JP) .................................. 2006-090428

(51) Int. Cl.
| | |
|---|---|
| H04N 7/16 | (2011.01) |
| H04N 7/18 | (2006.01) |
| H04N 5/765 | (2006.01) |
| H04N 5/932 | (2006.01) |
| H04N 5/935 | (2006.01) |
| H04N 3/24 | (2006.01) |

(52) U.S. Cl. .......... 725/141; 725/80; 725/153; 386/200; 386/201; 386/231; 386/359; 386/360; 348/632; 348/633; 348/634

(58) Field of Classification Search ............... 381/59, 381/61, 94, 95, 119; 700/95; 348/632–634; 386/358–362

See application file for complete search history.

(56) References Cited

U.S. PATENT DOCUMENTS

| | | | |
|---|---|---|---|
| 5,327,176 A | 7/1994 | Forler et al. | |
| 5,815,297 A | 9/1998 | Ciciora | |
| 6,441,868 B1 * | 8/2002 | Park | .............................. 348/633 |
| 6,745,164 B2 | 6/2004 | Akita | |
| 7,088,398 B1 * | 8/2006 | Wolf et al. | .................. 348/423.1 |

(Continued)

FOREIGN PATENT DOCUMENTS

| | | |
|---|---|---|
| CN | 1099921 | 3/1995 |
| CN | 1041044 | 12/1998 |

(Continued)

OTHER PUBLICATIONS

The HAVi Specification. Version 1.1—Chapter 1: General pp. 1-7, Chapter 2: Overview, pp. 8-24, Chapter 6: APIs for Functional Component Modules, pp. 296-392, retrieved from the Internet: URL: http//www.havi.org/HAVI_1.1.pdf, May 15, 2001.

(Continued)

Primary Examiner — Kristine Kincaid
Assistant Examiner — Omar S Parra
(74) Attorney, Agent, or Firm — Blakely, Sokoloff, Taylor & Zafman LLP

(57) ABSTRACT

According to one embodiment, video image and voice signals are transmitted to a plurality of electronic devices each having at least one of a video image display function and a voice reproducing function. Information indicating the fact that at least one of a video image and a voice has been set in a mute state is acquired from each of the electronic devices. Based on the information, a processing operation is applied to the video image and voice signals supplied to each of the electronic devices.

14 Claims, 7 Drawing Sheets

U.S. PATENT DOCUMENTS

| | | |
|---|---|---|
| 7,180,511 B2 | 2/2007 | Shigeta |
| 7,468,755 B2 | 12/2008 | Ando |
| 2001/0050679 A1 | 12/2001 | Shigeta |
| 2004/0239676 A1 | 12/2004 | Yoo |
| 2005/0028211 A1 | 2/2005 | Mochizuki et al. |
| 2005/0068346 A1* | 3/2005 | Ogawa et al. .................. 345/699 |
| 2005/0259948 A1 | 11/2005 | Ando |
| 2006/0012710 A1 | 1/2006 | Sasaki |
| 2008/0138032 A1* | 6/2008 | Leyendecker et al. .......... 386/66 |
| 2009/0269037 A1 | 10/2009 | Mukaide et al. |

FOREIGN PATENT DOCUMENTS

| | | |
|---|---|---|
| CN | 1460366 | 12/2003 |
| EP | 0482958 | 4/1992 |
| EP | 0614315 | 9/1994 |
| EP | 1259082 | 11/2002 |
| JP | 60235592 | 11/1985 |
| JP | 4160945 | 6/1992 |
| JP | 10126768 | 5/1998 |
| JP | 2001356753 | 12/2001 |
| JP | 2002-344898 | 11/2002 |
| JP | 2005020725 | 1/2005 |
| JP | 2005-057714 | 3/2005 |
| JP | 2005167895 | 6/2005 |
| JP | 2005323182 | 11/2005 |
| JP | 2005341190 | 12/2005 |
| JP | 2006-019857 | 1/2006 |
| JP | 2006-033436 | 2/2006 |
| WO | WO 01/52553 | 7/2001 |
| WO | WO 02/078333 | 10/2002 |
| WO | 2006025441 | 3/2006 |

OTHER PUBLICATIONS

Kirby et al. "A New Technique to Maintain Sound and Picture Synchronization" EBU Technical Review—Summer 1995, Jun. 1, 1996, pp. 13-21.

European Search Report Application No. 06122794.8, Mailed Oct. 15, 2008.

United States Office Action dated Apr. 2, 2009 for U.S. Appl. No. 11/603,845, filed Nov. 22, 2006 entitled Audiovisual (AV) Device and Control Method Thereof.

Chinese Patent Application No. 200810181237.9, Notification of the First Office Action, mailed Jun. 12, 2010 (English translation).

First Office Action with English translation in a corresponding Chinese application No. 200610163095.4 dated Aug. 7, 2008.

Japanese Patent Application No. 2006-090428, Notice of Reasons for Rejection, mailed Apr. 20, 2010 (English translation).

* cited by examiner

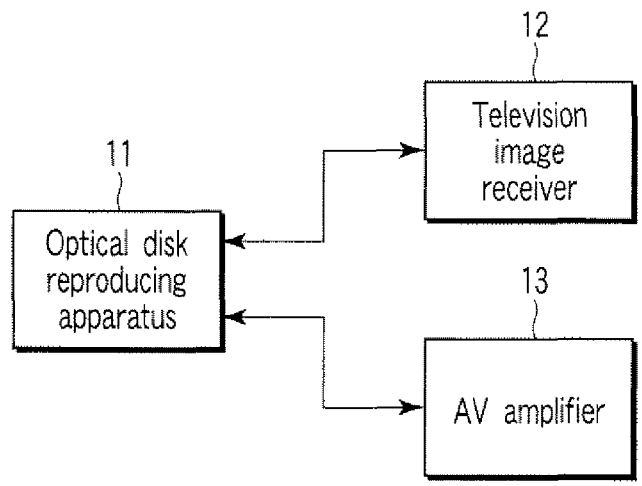
F I G. 1
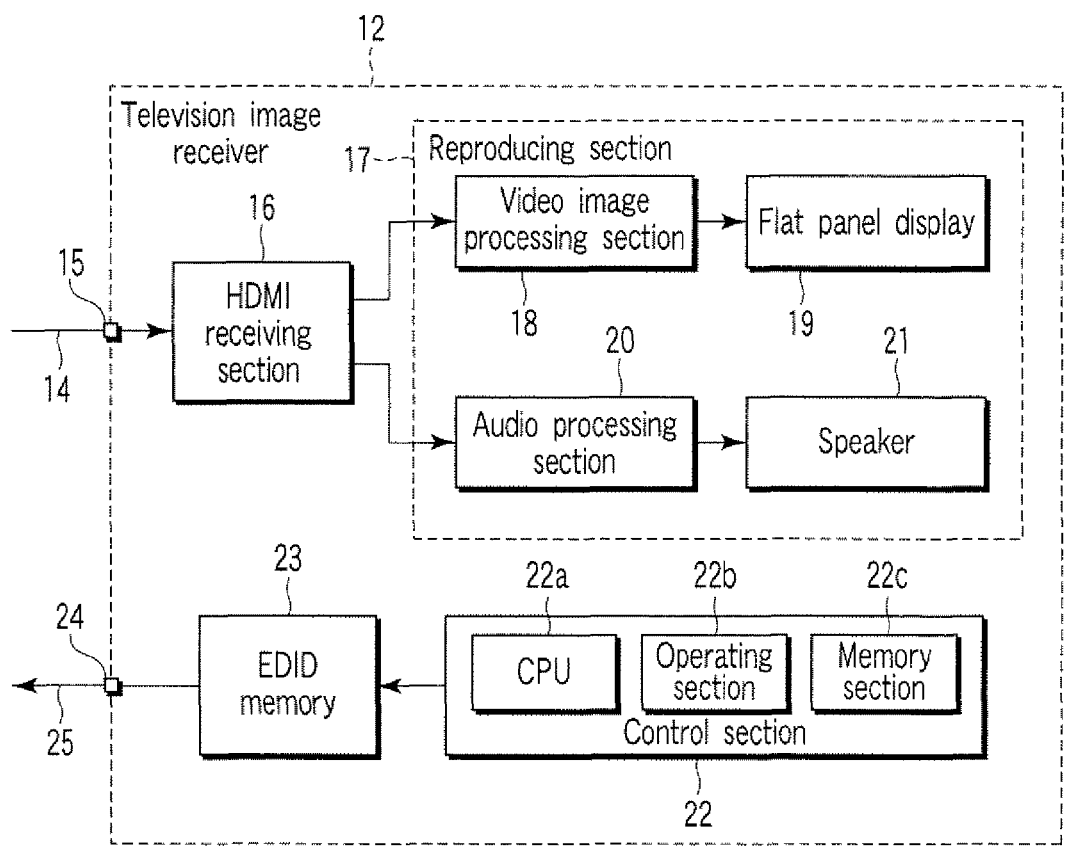
F I G. 2

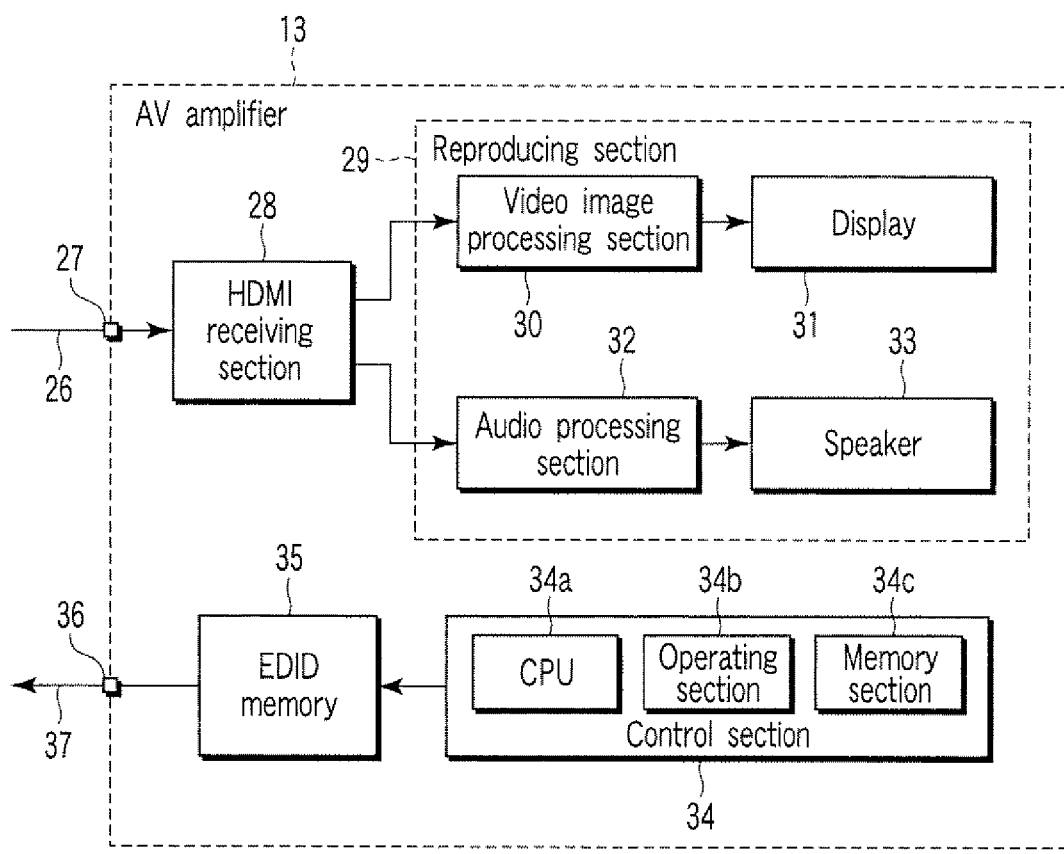
F I G. 4

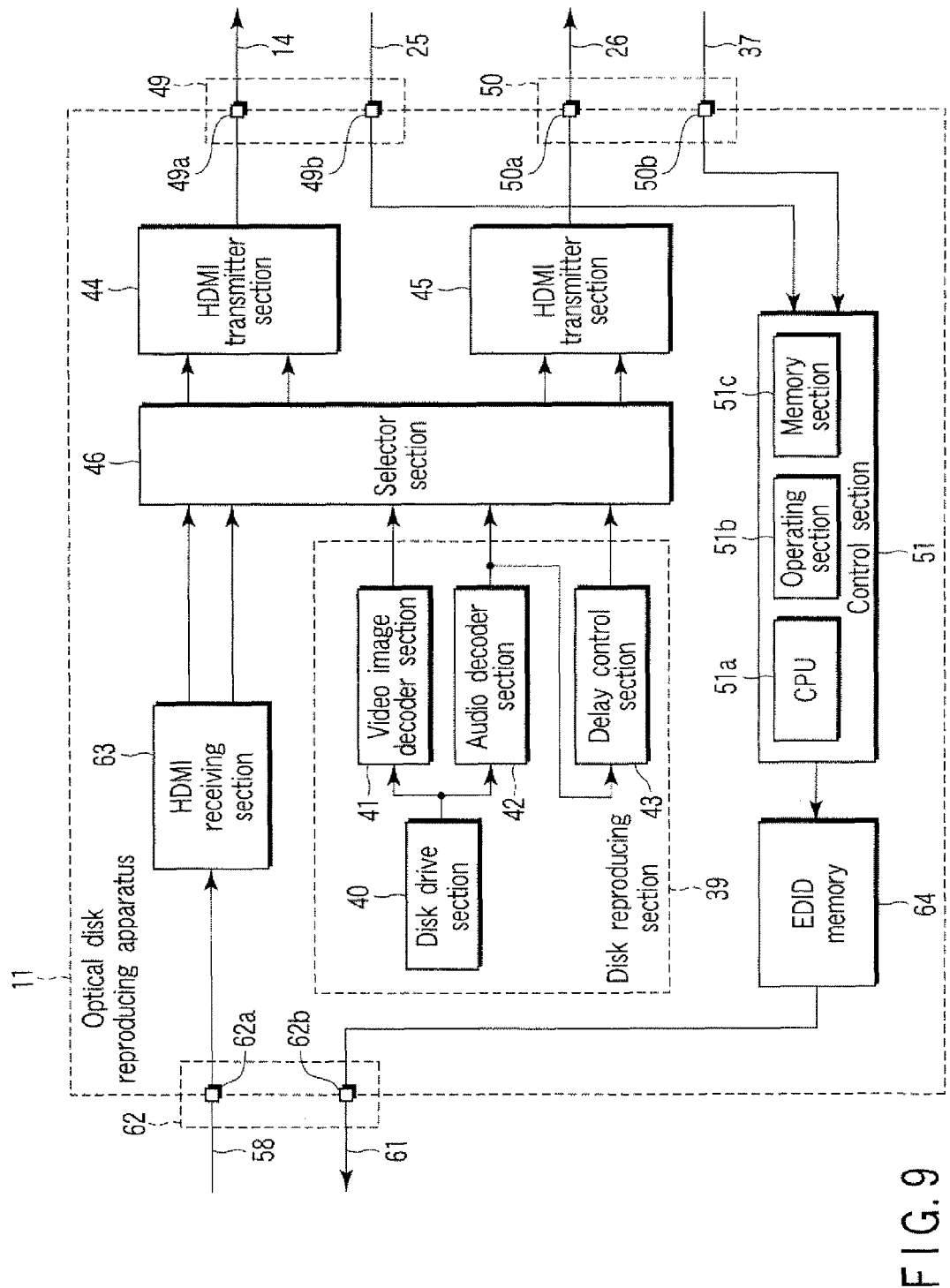
F I G. 9

AUDIOVISUAL (AV) DEVICE AND CONTROL METHOD THEREOF

CROSS-REFERENCE TO RELATED APPLICATIONS

This application is a divisional application of U.S. patent application Ser. No. 11/603,845 filed Nov. 22, 2006, which is based upon and claims the benefit of priority from Japanese Patent Application No. 2006-090428, filed Mar. 29, 2006, the entire contents of which are incorporated herein by reference.

BACKGROUND

1. Field

One embodiment of the invention relates to an audiovisual (AV) device that transmits or receives a signal such as a video image or audio, for example, to or from an externally connected electronic device. In addition, the present invention relates to an interface system for connecting the above-described AV device in plurality.

2. Description of the Related Art

As is well known, a digital visual interface (DVI) standard is prevalent as a standard for transmitting a digital video image signal. In recent years, a high definition multimedia interface (HDMI) standard has been employed as a digital signal transmission standard that is a further improvement of this DVI standard.

This HDMI standard, for example, includes a variety of stipulations that does not exit in the DVI standard such as the fact that a digital audio signal can be multiplexed and transmitted as audio in a blanking period of a digital video image signal, the fact that a digital video image signal is transmitted in an RGB signal format and can be transmitted in a format of a YCbCr signal or in a format of a YPbPr signal that is of higher quality than that of the YCbCr signal; and the fact that connection can be made via a USB (universal serial bus)-like small sized HDMI connector.

In addition, in the DVI standard or in the HDMI standard, in the case where one electronic device transmits a signal such as a video image or audio to the other electronic device, a transmitting electronic device acquires extended display identification data (EDID) from a receiving electronic device, thereby a signal can be output in a format that conforms to specification of receiving a display that the receiving electronic device has.

Further, in the DVI standard or in the HDMI standard, a plurality of signal output ports are installed on the transmitting electronic device, and the receiving electronic devices are connected to the signal output ports, thereby making it possible for the transmitting electronic devices to transmit an identical signal at the same time or a signal in another signal-converted format to a plurality of receiving electronic devices. In this manner, signal transmission can be achieved such that only a video image can be displayed by means of a receiving first electronic device, and then, only audio is reproduced by means of a second receiving electronic device.

For example, in the case where the HDMI standard has been employed, an optical disk reproducing apparatus that reproduces an optical disk such as a DVD (digital versatile disk) may operate as a transmitting electronic device while (i) and (i) a large screen high definition display and (ii) a 2-channel stereo speaker and an AV (audio video) amplifier, which may include a 5.1-channel audio reproducing function for example, operate as a plurality of receiving electronic devices. A video image with a high image quality is displayed by means of the television image receiver and audio with a high sound quality is reproduced by means of the AV amplifier.

In the meantime, it is necessary to synchronize the display video image by the television image receiver with audio reproduction by the AV amplifier. As a result, in the television image receiver and in the AV amplifier, times required for processing their video image signal and audio signal are recorded as the above-described EDID data.

Thus, an optical disk reproducing apparatus can acquire EDID data from the television image receiver and the AV amplifier, respectively, and can control the display video image and the reproduced audio in synchronism with each other by using the time required for video image signal processing of the television image receiver and the time required for audio signal processing of the AV amplifier.

However, in a current situation, for synchronization control, it is necessary for a user to input and set to which signal output port an electronic device is connected to an optical disk reproducing apparatus that is a transmitting electronic device, to which signal output port an electronic device is connected to display a video image, and to which signal output port an electronic device is connected to reproduce audio, and handling becomes complicated.

In Jpn. Pat. Appln. KOKAI Publication No. 2005-57714, there is disclosed a configuration such that at the time of connecting a plurality of receiver devices to a transmitter device and transmitting video image and audio data that conform to the HDMI standard, video image and audio data are transmitted to a receiver device capable of reproducing video image and audio based on the EDID data acquired from the receiver device; only video image data is transmitted to a receiver device capable of reproducing only video image; and only audio data is transmitted to a receiver device capable of reproducing only audio.

In addition, in Jpn. Pat. Appln. KOKAI Publication No. 2006-19857, there is disclosed a configuration such that a tuner, an image recording/reproducing apparatus, a monitor can be connected to each other in longitudinal manner; a receiver requests specification for a desired video image signal to a video image signal transmitter; and, in the case where the image recording/reproducing apparatus enters a stop mode, a video image signal outputted from the tuner is directly transmitted to the monitor.

Further, in Jpn. Pat. Appln. KOKAI Publication No. 2002-344898, IEEE1394 is disclosed as a standard for interconnecting AV devices, and a DVD player, a TV monitor, and an AV amplifier are connected to each other in accordance with the IEEE standard. In this document, there are described: means for obtaining processing delay information for video image display processing of the TV monitor; and means for an AV amplifier to acquire the information and to adjust audio delay.

Furthermore, in Jpn. Pat. Appln. KOKAI Publication No. 2006-33436, an HDMI standard is disclosed as a standard for interconnecting AV devices; and between a video image monitor and an AV amplifier and between the AV amplifier and a DVD player are connected to each other in accordance with the HDMI standard. Moreover, there are described means for acquiring a delay time for monitor video image display processing and means for delaying an audio signal.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 1 is an exemplary block diagram showing an embodiment of the present invention, the block diagram being adapted to explain an example of a signal transmitting system that conforms to an HDMI standard;

FIG. 2 is an exemplary block diagram adapted to explain a signal processing system of a television image receiver provided as a receiving AV device in the same embodiment;

FIG. 4 is an exemplary block diagram adapted to explain a signal processing system of an AV amplifier that is a receiving AV device in the same embodiment;

FIG. 9 is an exemplary block diagram adapted to explain a signal processing system of an optical disk reproducing apparatus that is a transmitting AV device in another example of the same signal transmitting system.

DETAILED DESCRIPTION

Figure 3:
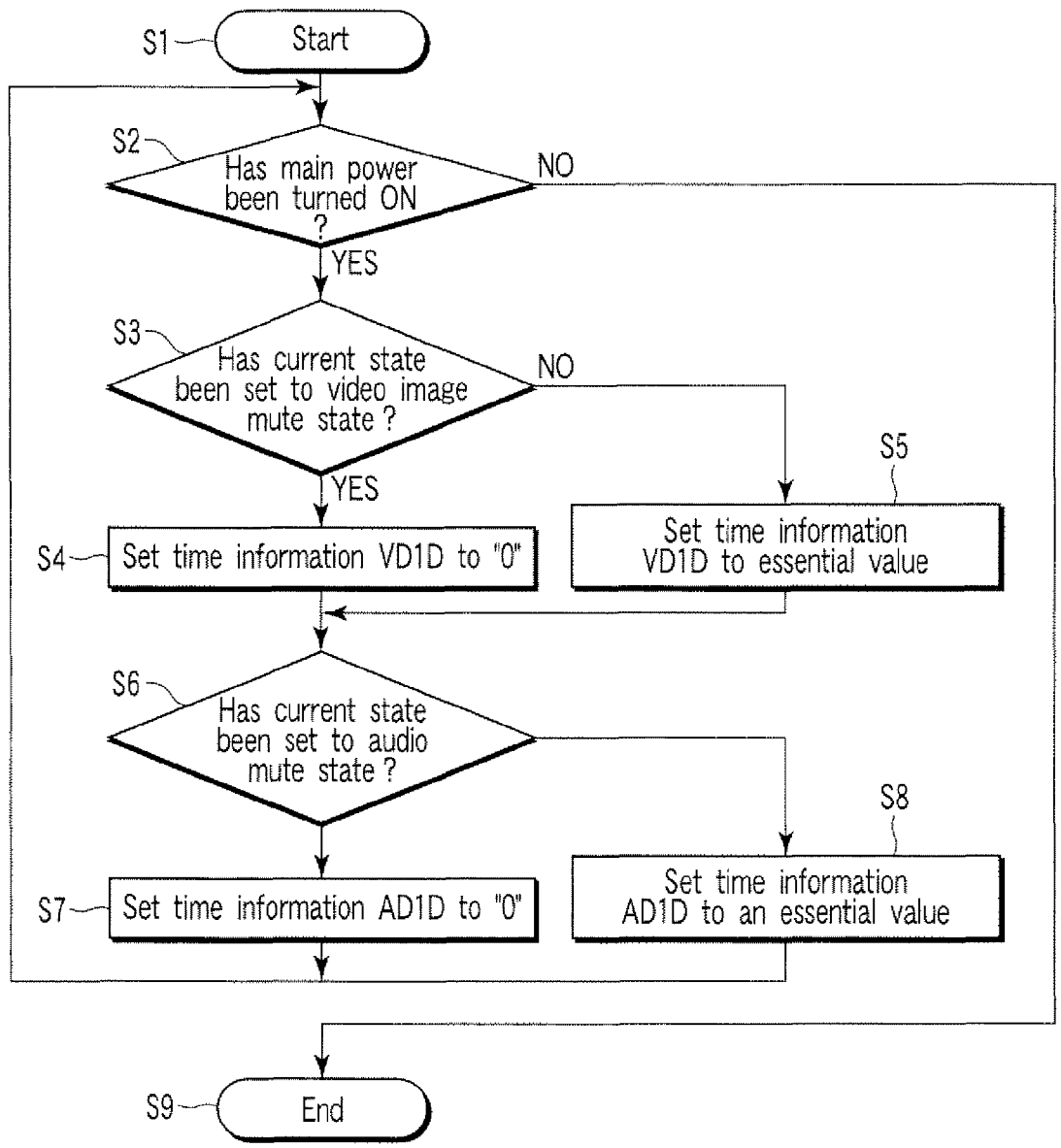
FIG. 3 is an exemplary flow chart adapted to explain a main processing operation of the television image receiver in the same embodiment.

Various embodiments according to the invention will be described hereinafter with reference to the accompanying drawings. In general, according to one embodiment of the invention, video image and audio signals are transmitted to a plurality of electronic devices each having at least one of a video image display function and audio reproducing function. Information indicating the fact that at least one of a video image and audio has been set in a mute state is acquired from each of the electronic devices. Based on the information, a processing operation is applied to the video image and audio signals supplied to each of the electronic devices.

Certain details are set forth below in order to provide a thorough understanding of various embodiments of the invention, albeit the invention may be practiced through many embodiments other that those illustrated. Herein, certain terminology is used to describe features of the invention such as the term "section" that represents hardware and/or software configured to perform one or more particular functions.

FIG. 1 shows an exemplary configuration of a signal transmitting system that conforms to an HDMI standard described in the present embodiment. That is, in FIG. 1, reference numeral 11 denotes an optimal disk reproducing apparatus. This optical disk reproducing apparatus 11 is provided as a transmitting AV device in the signal transmitting system.

This optical disk reproducing apparatus 11 reads data recorded in an optical disk such as a DVD, for example, and reproduces a digital video image signal and an audio signal. Then, the digital video image signal and audio signal reproduced by this optical disk reproducing apparatus 11 are converted to digital data in a format that conforms to the HDMI standard, and is outputted to a plurality of receiving AV devices (two devices as illustrated).

In the present embodiment, two receiving AV devices are: a television image receiver 12 having a flat panel display capable of displaying a high definition video image on a large screen and enabling audio reproduction of stereo 2 channels; and an AV amplifier 13 having a function of reproducing audio with a high sound quality with multi-channels such as 5.1 channel and capable of displaying a video image on a small screen.

FIG. 2 shows an exemplary signal processing system of the above-described television image receiver 12. In FIG. 2, constituent elements which receive, channel-select, and demodulate a television broadcast signal are not described for the sake of simplification. That is, digital data outputted from the above-described optical disk reproducing apparatus 11 in a format that conforms to the HDMI standard is supplied to an input terminal 15 of the television image receiver 12 via a TMDS signal transmission path 14.

The digital data supplied to this input terminal 15 is supplied to an HDMI receiving section 16, and then, the resulting signal is demultiplexed into a digital video image signal and an audio signal. Among them, the digital video image signal is supplied to a video image processing section 18 that configures a reproducing section 17, a predetermined video image signal processing operation is applied, and then, the video image is displayed on a flat panel display 19.

In addition, the digital audio signal demultiplexed at the HDMI receiving section 16 is supplied to an audio processing section 20 that configures the above-described reproducing section 17, a predetermined audio signal processing operation is applied, and then, the audio is reproduced by means of a speaker 21 that corresponds to stereo 2 channels.

Where the demultiplexed digital audio signal includes control delay data CDL described later, the HDMI receiving section 16 performs various operations so as to delay and output a digital audio signal by a time interval specified by the control delay data CDL.

In addition, this television image receiver 12 causes a control section 22 to integrally control all of the operations including the above-described reproducing operation. This control section 22 incorporates a central processing unit (CPU) 22a, receives operation information from an operating section 22b, and controls each section so that its operational contents are reflected.

In this case, the control section 22 utilizes a memory section 22c. This memory section 22c mainly has: a red only memory (ROM) having stored therein a control program executed by the CPU 22a; a random access memory (RAM) that provides a work area in the CPU 22a; and a nonvolatile memory having stored therein a variety of setting information, control information or the like.

In addition, this control section 22 is connected to an EDID memory 23. This EDID memory 23 records, as EDID: information indicating receiving specification of the television image receiver 12 (video image display capability, audio reproduction, and display capability); time information VD1D indicating a time VD1 required for a video image signal processing operation at the video image receiving section 18; time information AD1D indicating a time AD1 required for an audio signal processing operation at the audio processing section 20, and the like.

Here, in the above-described control section 22, when a user operates the above-described operating section 22b, thereby setting a video image mute state, namely, when a current state is set to a state for stopping a video image display in the flat panel display 19, information indicating the fact that the television image receiver 12 has been set in a state in which the receiver is not provided for viewing of a video image is written into the EDID memory 23.

Writing into the EDID memory 23 the information indicating that this television image receiver 12 has been set in a state in which the receiver is not provided for video image viewing is easily achieved by rewriting into a value that cannot be generally taken, for example, "0", the time information VD1D indicating the time VD1 required for the video image signal processing operation at the video image processing section 18.

In addition, in the above-described control section 22, when a user operates the above-described operating section 22b in an audio mute state, namely, when a current state is set to a state for stopping audio reproduction in the speaker 21, information indicating the fact that the television image receiver 12 has been set in a state in which the receiver is not provided for audio reception (and subsequent output) is written into the EDID memory 23.

Writing into the EDID memory 23 the information indicating that this television image receiver 12 has been set in a state in which the receiver is not provided for audio reception is easily achieved by rewriting into a value that cannot be generally taken, for example, "0", the time information AD1D indicating the time AD1 required for the audio signal processing operation at the audio processing section 20.

That is, the time VD1 required for the video image signal processing operation at the above-described video image processing section 18 and the time AD1 required for the audio signal processing operation at the audio processing section 20 are generally stored in the EDID memory 23 in units of 1 millisecond, for example; 1 millisecond is set at minimum, and "0" is not set. Thus, the fact that time information VD1D and AD1D are set to "0" can be defined as a value that cannot be generally taken.

For example, it becomes possible to define 5 milliseconds or less as a value that cannot be generally taken, in a system in which the fact that times VD1 and AD1 are always set to be more than 5 milliseconds is known in advance.

In addition, a variety of information stored in this EDID memory 23 are read out from the EDID memory 23 upon request from the optical disk reproducing apparatus 11 that is a transmitting AV device, and the read out information is transmitted to the optical disk reproducing apparatus 11 via an output terminal 24 and a DDC (display data channel) communication path 25.

Thus, in the optical disk reproducing apparatus 11, information is acquired from the EDID memory 23 of the television image receiver 12, and the time information VD1D indicating the time VD1 required for the video image signal processing operation at the video image processing section 18 is set to "0", thereby making it possible to easily identify the fact that the television image receiver 12 is set in a state in which the receiver is not provided for viewing of a video image.

In addition, the optical disk reproducing apparatus 11 acquires information from the EDID memory 23 of the television image receiver 12, and then, sets to "0" the time information AD1D indicating the time AD1 required for the audio signal processing operation at the audio processing section 20, thereby making it possible to easily identify the fact that the television image receiver 12 is set in a state in which the receiver is not provided for audio reception.

FIG. 3 shows a flow chart summarizing an operation of rewriting time information VD1D and AD1D of the EDID memory 23 in the above-described television image receiver 12. That is, when a processing operation is started (block S1), the control section 22 determines whether or not main power of the television image receiver 12 has been turned ON in block S2. In the case where it has been determined that the main power is not turned ON (NO), the processing operation is terminated (block S9).

In addition, in the case where it has been determined that main power is turned ON in the above block S2 (YES), the control section 22 determines whether or not a video image mute state has been set by means of a user in block S3. Then, in the case where it has been determined that the video image mute state is set (YES), the control section 22 sets to "0" the time information VD1D indicating the time VD1 required for the video image signal processing operation at the video image processing section 18, the time information being stored in the EDID memory 23, in block S4.

On the other hand, in the case where it has been determined that the video image mute state is not set in the above block S3 (NO), the control section 22 sets to an essential value the time information VD1D indicating the time VD1 required for the video image signal processing operation at the video image processing section 18, the time information being stored in the EDID memory 23, in block S5.

After the above block S4 or block S5, the control section 22 determines whether or not an audio mute state has been set by a user, in block S6. In the case where it has been determined that the audio mute state is set (YES), the control section 22 sets to "0" the time information AD1D indicating the time AD1 required for the audio signal processing operation at the audio processing section 20, the time information being stored in the EDID memory 23, in block S7, and a current processing operation returns to that shown in block S2.

In the case where it has been determined that the audio mute state is not set in the above block S6 (NO), the control section 22 sets to the essential value the time information AD1D indicating the time AD1 required for the audio signal processing operation at the audio processing section 20, the time information being stored in the EDID memory 23, in block S8, and a current processing operation returns to that shown in block S2.

According to the television image receiver 12 that is the above-described receiving AV device, in the case where the video image mute state has been set by the user, the time information VD1D indicating the time VD1 required for the video image signal processing operation at the video image processing section 18, the time information being stored in the EDID memory 23, is set to "0". In the case where the audio mute state has been set by the user, the time information AD1D indicating the time AD1 required for the audio signal processing operation at the audio processing section 20, the time information being stored in the EDID memory 23, is set to "0".

Thus, the television image receiver 12 causes the optical disk reproducing apparatus 11 that is a transmitting AD device to acquire the time information VD1D and AD1D stored in the EDID memory 23, thereby making it possible to easily identify the fact that the television image receiver 12 has been set in a state in which the receiver is not provided for video image viewing or audio reception.

In the case where an audio mute key of the operating section 22b is operated, the television image receiver 12 is set to the audio mute state. In addition, in the case where a volume control operator of the operating section 22b is controlled to a position that corresponds to a minimum volume, the audio mute state is set. That is, the above description expressing a video image mute and an audio mute denotes a state in which the receiver is not mainly provided for viewing or reception.

FIG. 4 shows a signal processing system of the above-described AV amplifier 13. That is, digital data outputted from the above-described optical disk reproducing apparatus 11 in a format that conforms to the HDMI standard is supplied to an input terminal 27 of the AV amplifier 13 via the TMDS signal transmission path 26.

The digital data supplied to this input terminal 27 is supplied to an HDMI receiving section 28, and the resulting digital data is demultiplexed into a digital video image and a digital audio signal. From among them, the digital video image signal is supplied to a video image processing section 30 that configures a reproducing section 29, a predetermined video image signal processing operation is applied, and then, a video image is displayed on a small screen display 31.

In addition, the digital audio signal demultiplexed by the HDMI receiving section 28 is supplied to an audio processing section 32 that configures the above-described reproducing section 29, a predetermined audio signal processing operation is applied, and then, audio is reproduced by a speaker 33 that corresponds to 5.1 channel.

In this HDMI receiving section 28, there is provided a function of, in the case where the demultiplexed digital audio signal includes control delay data CDL, delaying and outputting the digital audio signal with the control delay data CDL by a specified time.

This AV amplifier 13 causes a control section 34 to integrally control all of the operations including the above-described reproducing operation. This control section 34 incorporates a CPU 34a, and controls each section so that its operational contents are reflected, based on the operation information from the operating section 34b.

In this case, the control section 34 utilizes a memory section 34c. This memory section 34c mainly has: a ROM having stored therein a control program executed by the CPU 34a; a RAM that provides a work area to the CPU 34a; and a non-volatile memory having stored therein a variety of setting information, control information and the like.

This control section 34 is connected to an EDID memory 35. This EDID memory 35 records, as EDID: information indicating receiving specification (video image display capability and audio reproducing capability) of the AV amplifier 13; time information VD2D indicating a time VD2 required for a video image signal processing operation at the video image processing section 30; time information AD2D indicating a time AD2 required for an audio signal processing operation at the audio processing section 32 and the like.

Here, in the above-described control section 34, when a user operates the above-described operating section 34b, and sets a current state to video image mute state, namely, when a state for stopping a video image display in the display 31 has been set, information indicating the fact that the AV amplifier 13 has been set in a state in which the amplifier is not provided for video image viewing (in actuality, a video image display may be provided, but a user is mainly watching the television image receiver 12) is written into the EDID memory 35.

Writing into the EDID memory 35 the information indicating that this AV amplifier 13 has been set in a state in which the amplifier is not provided for video image viewing is easily achieved by rewriting to a value that cannot be generally taken, for example, "0", the time information VD2D indicating the time VD2 required for the video image signal processing operation at the video image processing section 30.

In addition, in the above-described control section 34, when a user operates the above-described operating section 34b, and sets a current state to an audio mute state, namely, when a current state is set to a state for stopping audio reproduction in the speaker 33, information indicating the fact that the AV amplifier 13 has been set to a state in which the amplifier is not provided for audio reception is written into the EDID memory 35.

Writing into the EDID memory 35 the information indicating that this AV amplifier 13 has been set in a state in which the amplifier is not provided for audio reception is easily achieved by rewriting to a value that cannot be generally taken, for example, "0", the time information AD2D indicating the time AD2 required for the audio signal processing operation at the audio image processing section 32.

That is, the time VD2 required for the video image signal processing operation at the above-described video image processing section 30 and the time AD2 required for the audio signal processing operation at the audio processing section 32 are stored in the EDID memory 35 in units of 1 millisecond, in general, 1 millisecond is set to the minimum, and "0" is not set. Thus, the fact that time information VD2D and AD2D are set to "0" can be defined as a value that cannot be taken in general.

For example, it becomes possible to define 5 milliseconds or less as a value that cannot be taken in general in a system in which times VD2 and AD2 are known to be always more than 5 milliseconds.

In addition, a variety of information stored in this EDID memory 35 are read out from the EDID memory 35 upon request from the optical disk reproducing apparatus 11 that is a transmitting AD device, and the read out information is transmitted to the optical disk reproducing apparatus 11 via an output terminal 36 and a DDC communication path 37.

Thus, the optical disk reproducing apparatus 11 acquires information from the EDID memory 35 of the AV amplifier 13, and then, sets to "0" time information VD2D indicating the time VD2 required for the video image signal processing operation at the video image processing section 30, thereby making it possible to easily identify the fact that the AV amplifier 13 has been set in a state in which the amplifier is not provided for video image viewing.

In addition, the optical disk reproducing apparatus 11 acquires information from the EDID memory 35 of the AV amplifier 13, and sets to "0" the time information AD2D indicating the time AD2 required for the audio signal processing operation at the audio processing section 32, thereby making it possible to easily identify the fact that the AV amplifier 13 has been set to a state in which the amplifier is not provided for audio reception.

According to the AV amplifier 13 that is the above-described receiving AV device, in the case where a video image mute state has been set by a user, the time information VD2D indicating the time VD2 required for the video image signal processing operation at the video image processing section 30, the time information being stored in the EDID memory 35, is set to "0". When an audio mute state has been set by the user, the time information AD2D indicating the time AD2 required for the audio signal processing operation at the audio processing section 32, the time information being stored in the EDID memory 35, is set to "0".

Thus, the AV amplifier 13 causes the optical disk reproducing apparatus 11 that is a transmitting AV device to acquire the time information VD2D and AD2D stored in that EDID memory 35, thereby making it possible to easily identify the fact that the AV amplifier 13 has been set in a state in which the amplifier is not provided for video image viewing or audio reception.

As the AV amplifier 13, a current state is set to an audio mute state in the case where an audio mute key of an operating section 34b of the amplifier has been operated. In addition, in the case where a volume control operator of the operating section 34b has been controlled to a position that corresponds to a minimum volume, the audio mute state is set. Alternatively, in the case where a state of headphone listening is established and no video image display is mainly set by a user, the audio mute state is set.

Figure 5:
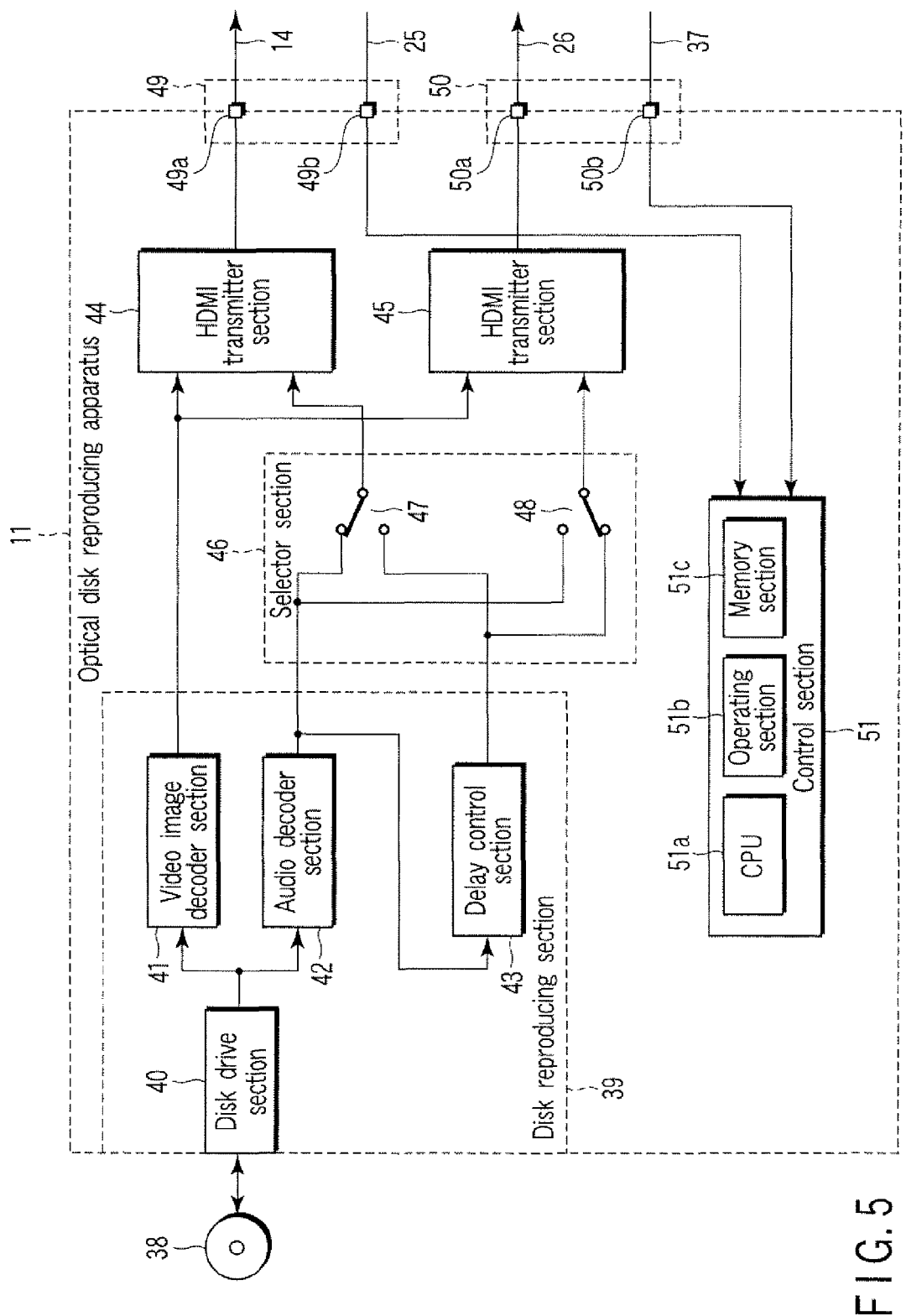
FIG. 5 is an exemplary block diagram adapted to explain a signal processing system of an optical disk reproducing apparatus that is a transmitting AV device in the same embodiment.

FIG. 5 shows a signal processing system of the above-described optical disk reproducing apparatus 11. That is, an optical disk 38 such as a DVD is mounted on a disk drive section 40 that configures a disk reproducing section 39, and data recorded therein is read. The data read by this disk drive section 40 is supplied to a video image decoder section 41 and an audio decoder section 42, respectively.

Among them, the video image decoder section 41 samples a video image component from inputted data, and then, applies a decoding processing operation, thereby generating a digital video image signal. In addition, the audio decoder section 42 samples an audio component from the inputted data, and then, applies a decoding processing operation, thereby generating a digital audio signal.

Then, the digital audio signal generated by the above-described audio decoder section 42 is supplied to a delay control section 43, and a predetermined amount of delay processing operation described later is applied. In addition, this delay control section 43 controls a delay amount when a delay processing operation is applied to the inputted digital audio signal.

Here, the digital video image signal generated by the above-described video image decoder section 41 is supplied to an input terminal of each of two HDMI transmitter sections 44 and 45. In addition, the digital audio signal outputted from the audio decoder section 42 and the digital audio signal outputted from the delay control section 43 are selectively supplied by means of a switch 47 that configures a selector section 46 to the other input terminal of the HDMI transmitter section 44.

In addition, the digital audio signal outputted from the audio decoder section 42 and the digital audio signal outputted from the delay control section 43 are selectively supplied by means of a switch 48 that configures the selector section 46 to the other input terminal of the HDMI transmitter section 45.

The above-described HDMI transmitter section 44 temporally multiplexes the inputted digital video image signal and audio signal; converts the multiplexed signals to digital data in a format that conforms to the HDMI standard; and outputs the converted data to the television image receiver 12 via an output terminal 49a of an input/output port 49 and the TMDS signal transmission path 14.

In addition, the above-described HDMI transmitter section 45 temporally multiplexes the inputted digital video image signal and audio signal; converts the multiplexed signals to digital data in a format that conforms to the HDMI standard; and outputs the converted data to the AV amplifier 13 via an output terminal 50a of an input/output port 50 and the TMDS signal transmission path 26.

Thus, the optical disk reproducing apparatus 11 causes a control section 51 to integrally control all of the operations including the above-described reproducing operation. This control section 51 incorporates a CPU 51a, and controls each section so that its operational contents are reflected, respectively, based on operation information from an operating section 51b.

In this case, the control section 51 utilizes a memory section 51c. This memory section 51c mainly has: a ROM having stored therein a control program executed by the CPU 51a; a RAM that provides a work area to the CPU 51a; a nonvolatile memory having stored therein a variety of setting information and control information and the like.

In addition, this control section 51 is connected to a DDC communication path 25 for transmitting information read out from the EDID memory 23 of the television image receiver 12 via the input terminal 49b of the input/output port 49. Further, this control section 51 is connected to a DDC communication path 37 for transmitting information read out from the EDID memory 35 of the AV amplifier 13 via the input terminal 50b of the input/output port 50.

In this manner, the control section 51 can acquire information stored in the EDID memory 23 of the television image receiver 12 and information stored in the EDID memory 35 of the AV amplifier 13, respectively.

Figure 6:
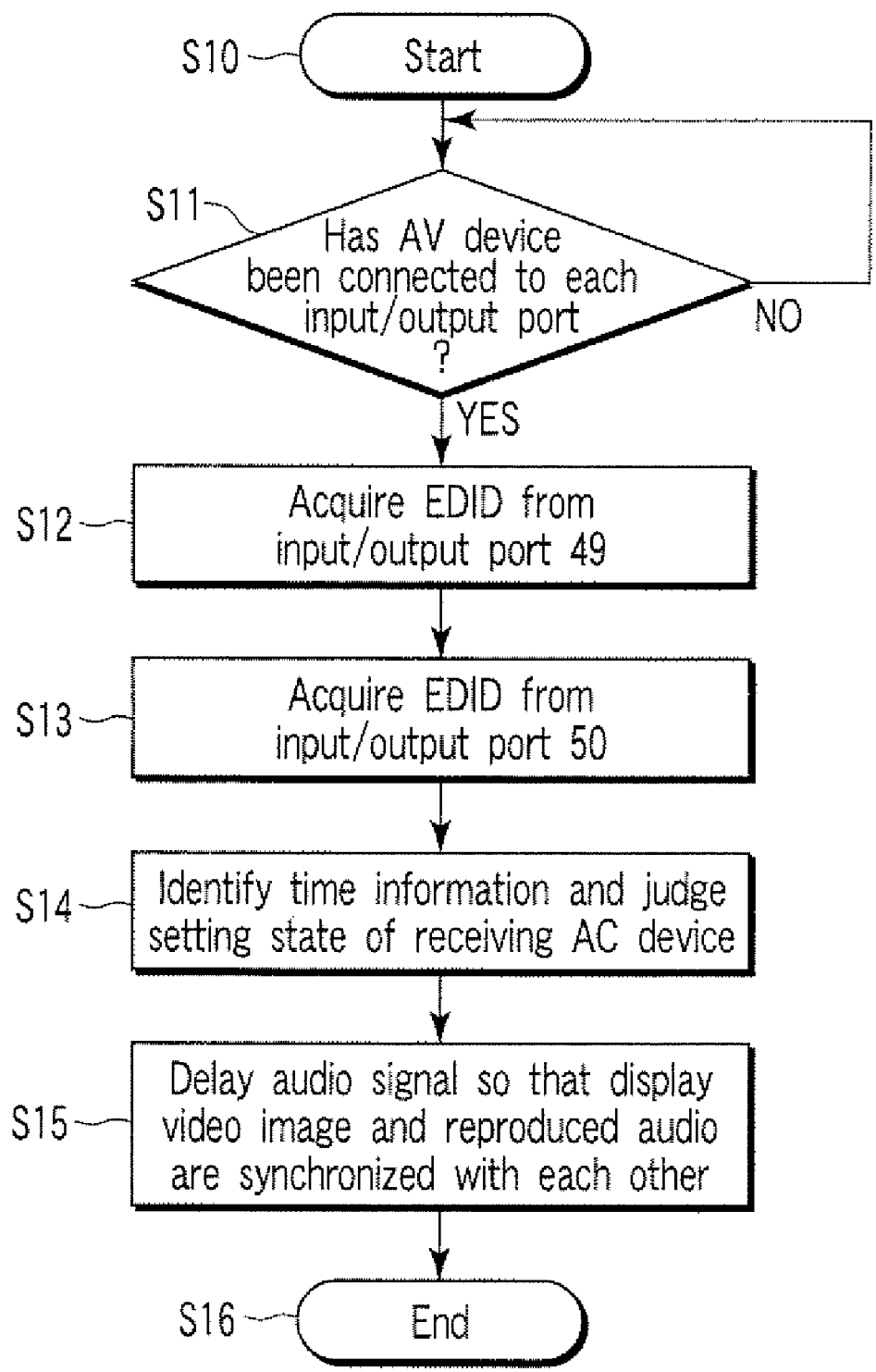
FIG. 6 is an exemplary flow chart adapted to explain a main processing operation of the optical disk reproducing apparatus in the same embodiment.

FIG. 6 shows a flow chart summarizing an operation of the optical disk reproducing apparatus 11 automatically judging an AV device that displays a video image and an AV device that reproduces audio, based on the information stored in the EDID memory 23 of the television image receiver 12 and the information stored in the EDID memory 35 of the AV amplifier 13; and controlling the displayed video image and the reproduced audio so as to be synchronized with each other.

Now, an operation will be described by way of example in which a user provides settings so as to view a display video image by the flat panel display 19 of the television image receiver 12 and so as to hear a reproduced audio by the speaker 33 of the AV amplifier 13.

That is, in this case, the user sets the television image receiver 12 to an audio mute state, namely, to a state in which the television image receiver 12 is not provided for audio reception, and sets the AV amplifier 13 to a video image mute state, namely, to a state in which the AV amplifier 13 is not provided for video image viewing.

Thus, the EDID memory 23 of the television image receiver 12 sets to "0" time information AD1D indicating a time AD1 required for the audio signal processing operation at that audio processing section 20. The EDID memory 35 of the AV amplifier 13 sets to "0" time information VD2D indicating a time VD2 required for the video image signal processing operation at the video image processing section 30.

When a processing operation is started (in block S10), the control section 51 of the optical disk reproducing apparatus 11 determines whether or not receiving AV devices (television image receiver 12 and AV amplifier 13 in this case) have been connected to both of the two input/output ports 49 and 50, respectively, in block S11.

In the case where it is determined that the above connection has been made (YES), the control section 51 requests the television image receiver 12 to acquire the information stored in its EDID memory 23 in block S12, and then, requests the AV device 13 to acquire the information stored in its EDID memory 35 in block S13.

Then, in block S14, from among the information acquired from each of the EDID memories 23 and 35, the control section 51 identifies values of: time information VD1D indicating a time VD1 required for a video image signal processing operation at the video image processing section 18; time information AD1D indicating a time AD1 required for an audio signal processing operation at the audio processing section 20; time information VD2D indicating a time VD2 required for a video image signal processing operation at the video image processing section 30; and time information AD2D indicating a time AD2 required for an audio signal processing operation at the audio processing section 32.

In this case, as described previously, the time information AD1D and VD2D are set to "0", and the time information VD1D and AD2D have predetermined values. In this manner, the control section 51 sets the television image receiver 12 in a state in which the image receiver is not provided for audio reception, and then, sets the AV amplifier 13 in a state in which the amplifier is not provided for video image viewing. Namely, it is possible to determine that video image display by the television image receiver 12 and audio reproduction by the AV amplifier 13 are set so as to be carried out.

Thus, in block S15, the control section 51 supplies to the delay control section 43 a difference between the time information VD1D indicating the time VD1 required for the video image signal processing at the video image processing section 18 and the time information AD2D indicating the time AD2 required for the audio signal processing operation at the audio processing section 32, and then, delays a digital audio signal outputted from the audio decoder section 42 so that a video image displayed on the flat panel display 19 of the television image receiver 12 and audio reproduced by the speaker 33 of the AV amplifier 13 are synchronized with each other; and terminates a processing operation (in block S16).

The delay control section 43 delays a time component obtained by subtracting time information AD2D from time information VD1D so as to delay a digital audio signal outputted from the audio decoder section 42 by this time component, so that an audio signal outputted from the audio processing section 32 is synchronized with a video image signal outputted from the video image processing section 18, namely, a shorter time required for a signal processing operation is adjusted to a longer time.

Then, while the digital video image signal outputted from the video image decoder section 41 of the optical disk reproducing apparatus 11 is supplied to the television image receiver 12 and the AV amplifier 13 via the HDMI transmitter sections 44 and 45, the AV amplifier 13 is set to a video image mute state so as to be provided for video image display on the flat panel display 19 of the television image receiver 12.

In addition, the digital audio signals each outputted from the audio decoder section 42 and the delay control section 43 are selected by means of the switch 47 of the selector section 46, and the selected signals each are supplied to the television image receiver 12 via the HDMI transmitter section 44. However, the television image receiver 12 is set to an audio mute state, and thus, is not provided for audio reproduction thereat.

On the other hand, the digital audio signals each outputted from the audio decoder section 42 and the delay control section 43 are selected by means of the switch 48 of the selector section 46, and the selected signals each are supplied to the AV amplifier 13 via the HDMI transmitter section 45, and then, is provided for audio reproduction thereat.

In this case, as shown in FIG. 5, assuming that the switch 48 has been changed so as to supply the digital audio signal outputted from the delay control section 43 to the HDMI transmitter section 45, the digital audio signal to which a delay processing operation of a quantity required to obtain synchronization with a display video image has been applied is supplied to the AV amplifier 13. Thus, the AV amplifier 13 enables audio to be synchronized with a video image by signal-processing the supplied digital audio signal as it is, and then, causing the speaker 33 to reproduce the audio. Means for transmitting this fact is the control delay data CDL transmitted to the AV amplifier 13, and, in this case, "0" is set. The control delay data CDL is calculated on the side of the optical disk reproducing apparatus 11; a delay is controlled; and the control value CDL at the later stage is calculated and sent.

In addition, unlike FIG. 5, assuming that the above switch 48 has been changed so as to supply the digital audio signal outputted from the audio decoder section 42 to the HDMI transmitter section 45, a signal obtained when the control delay data CDL has been multiplexed without applying a delay processing operation is supplied to the AV amplifier 13 as HDMI transmission.

In this case, the HDMI receiving section 28 of the AV amplifier 13 functions to apply and output the delay processing operation based on the multiplexed control delay data CDL in response to an HDMI signal after the digital video image signal and audio signal have been demultiplexed from the inputted digital data. Thus, the AV amplifier 13 enables audio to be synchronized with a video image by causing the HDMI receiving section 28 to signal-process a digital audio signal to which a delay processing operation of a quantity required to obtain synchronization with a display video image is applied and by causing the speaker 33 to reproduce audio.

The switches 47 and 48 of the above selector section 46 each are changed under the control of the control section 51. For example, the control section 51 can identify the performance of each AV device based on the EDID acquired from external receiving AV device and can control change of each of the switches 47 and 48 in response to a result of the identification.

The above-described optical disk reproducing apparatus 11 automatically identifies that, based on time information VD1D, AD1D, VD2D, and AD2D stored in the EDID memories 23 and 35 of the receiving television image receiver 12 and the AV amplifier 13, the television image receiver 12 is set by a user so as not to be provided for voice reception, and then, the AV amplifier 13 is set by a user so as not to be provided for video image viewing. In addition, this reproducing apparatus is controlled so that the video image displayed by the television image receiver 12 and the voice reproduced by the AV amplifier 13 are synchronized with each other. Thus, the user's handling can be made very convenient.

While, in the above-described optical disk reproducing apparatus 11, the digital audio signal applied with a decoding processing operation is supplied to the AV amplifier 13 to reproduce audio, for example, it is a matter of course that a construction may be provided so as to supply to the AV amplifier 13 the digital audio signal in a compressed format before decoded, and then, apply a decoding processing operation to the audio signal by means of the AV amplifier 13.

Figure 7:
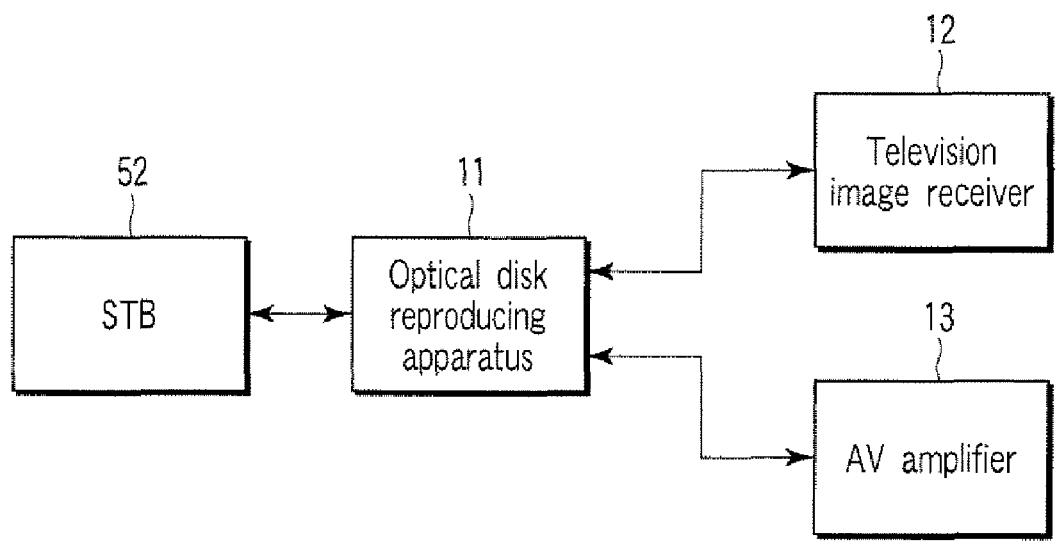
FIG. 7 is an exemplary block diagram adapted to explain another example of a signal transmitting system that conforms to an HDMI standard in the same embodiment.

FIG. 7 shows another example of a signal transmitting system that conforms to an HDMI standard. That is, this signal transmitting system comprises a STB (set top box) 52 as a transmitting AV device.

The digital video image signal and audio signal generated by this STB 52 are converted to digital data in a format that conforms to the HDMI standard, and then, the converted digital data is supplied to the television image receiver 12 and the AV amplifier 13 serving as receiving AV devices, via the above optical disk reproducing apparatus 11 serving as a relay device, and is provided for video image display and audio reproduction.

Figure 8:
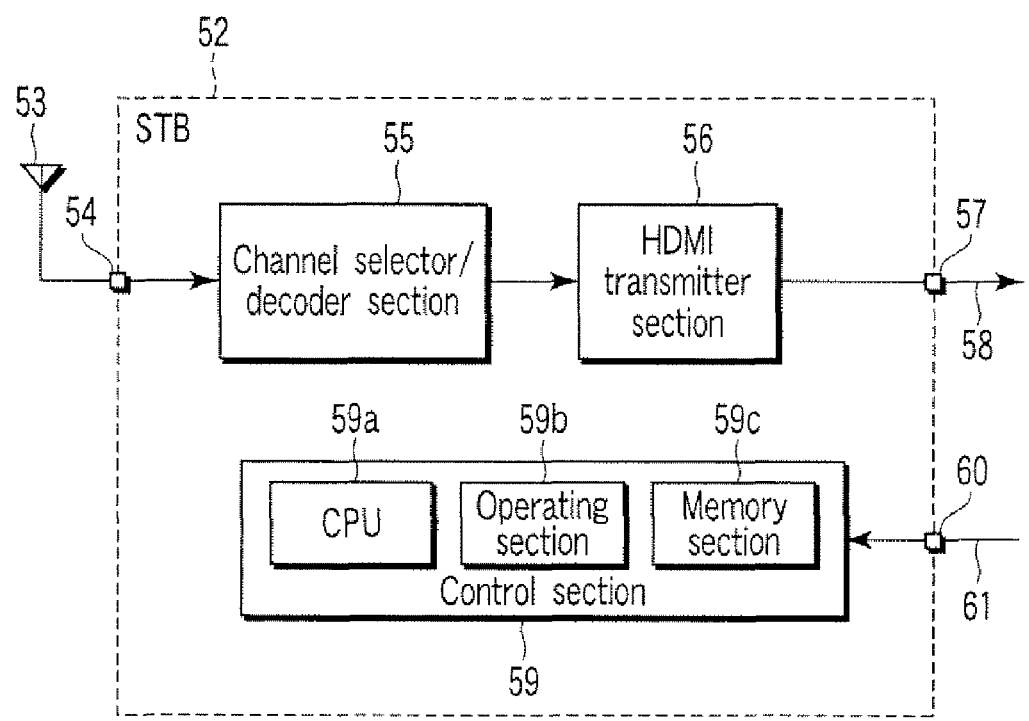
FIG. 8 is an exemplary block diagram adapted to explain a signal processing system of STB that is a transmitting AV device in another example of the same signal transmitting system.

FIG. 8 shows a signal processing system of the above-described STB 52. That is, the television broadcast signal received via an antenna 53 is supplied to a channel selector/decoder section 55 via an input terminal 54. This channel selector/decoder section 55 selects a signal of a predetermined channel from an inputted television broadcast signal, and then, applies a decoding processing operation to the thus channel-selected signal, thereby generating a digital video image signal and a digital audio signal.

Then, the digital video image signal and audio signal generated by this channel selector/decoder section 55 are supplied to an HDMI transmitter section 56. This HDMI transmitter section 56 temporally multiplexes the inputted digital video image signal and audio signal; converts the multiplexed signals to digital data in a format that conforms to the HDMI standard; and outputs the converted digital data to the optical disk reproducing apparatus 11 via an output terminal 57 and a TMDS signal transmission path 58.

Then, this STB 52 integrally controls all of the operations including the above-described receiving operation by means of a control section 59. This control section 59 incorporates a CPU 59a, and controls each section so that its operational contents are reflected, based on the operation information from an operating section 59b.

In this case, the control section 59 utilizes a memory section 59c. This memory section 59c mainly has: a ROM having stored therein a control program executed by the CPU 59a; a RAM that provides a work area to the CPU 59a; and a non-volatile memory having stored therein a variety of setting information, control information and the like.

In addition, this control section 59 is connected to a DDC communication path 61 for transmitting information read out from an EDID memory described later, the EDID memory being provided in the optical disk reproducing apparatus 11 via an input terminal 60.

FIG. 9 shows a signal processing system of the optical disk reproducing apparatus 11 in the case where it is used as a relay device. In FIG. 9, like constituent elements as those in FIG. 5 are designated by like reference numerals. That is, digital data in a format that conforms to the HDMI standard, the digital data being supplied from the above STB 52 via a TMDS signal transmission path 58, is supplied to an HDMI receiving section 63 via an input terminal 62a of an input/output port 62.

This HDMI receiving section 63 demultiplexes the inputted digital data into a digital video image signal and a digital audio signal. Then, the digital video image signal and audio signal outputted from this HDMI receiving section 63 are supplied to the above-described selector section 46.

In this case, the above selector section 46 extends its function so as to selectively carry out operations of: supplying to the HDMI transmitter sections 44 and 45 the digital video image signal and audio signal outputted from the HDMI receiving section 63, respectively; supplying to the HDMI transmitter sections 44 and 45, respectively, the digital video image signal outputted from the video image decoder section 41 of the above disk reproducing section 39; and carrying out the switching operation as described previously in FIG. 5 with respect to the digital audio signal outputted from the audio decoder section 42 and the digital audio signal outputted from the delay control section 43, and then, supplying the switched audio signals to the HDMI transmitter sections 44 and 45, respectively.

In addition, the optical disk reproducing apparatus 11 incorporates an EDID memory 64. As described previously, in the case where the television image receiver 12 is set in an audio mute state, and the AV amplifier 13 is set in a video image mute state, the control section 51 copies information relating to video image display acquired from the EDID memory 23 of the television image receiver 12. In addition, this control section 51 records in the EDID memory 64 time information VD3D obtained by adding information indicating a delay time VD3 of a video image signal of the selector section 46 in the optical disk reproducing apparatus 11, to time information VD1D indicating a time VD1 required for the video image signal processing operation at a video image processing section 18.

Further, the control section 51 copies information relating to audio display acquired from the EDID memory 35 of the AV amplifier 13. In addition, this control section records in the EDID memory 64, time information AD3D obtained by adding information indicating a delay time AD3 of an audio signal of the selector section 46 in the optical disk reproducing apparatus 11 to a time information AD2D indicating a time AD2 required for an audio signal processing operation at the audio processing section 32.

Then, the time information VD3D and AD3D stored in this EDID memory 64 are read out from the EDID memory 64 upon request from the STB 52 that is a transmitting AV device, and then, the read out information is transmitted to the STB 52 via the DDC communication path 61 of the input/output port 62.

Then, a control section 59 of the STB 52 calculates a difference between a sum of the time information VD3D acquired from the EDID memory 64 of the optical disk reproducing apparatus 11 and the video image processing delay time at the channel selector/decoder section 55 of the STB 52 and a sum of the time information AD3D and the audio processing delay time at the channel selector/decoder section 55 of the STB 52; and then, outputs to an HDMI transmitter section 56 the information indicating a time that corresponds to such a difference as control delay data CDL. In this manner, the HDMI transmitter section 56 multiplexed the control delay data CDL with a digital signal, and then, outputs the multiplexed data.

Thus, an HDMI receiving section 63 of the optical disk reproducing apparatus 11 functions to multiplex a digital video image signal and a digital audio signal from inputted digital data, and then, apply a delay processing operation based on the multiplexed control delay data CDL to the digital audio signal so as to output the applied signal to the AV amplifier 13. Thus, the AV amplifier 13 enables audio to be synchronized with a video image by signal-processing the digital audio signal applied with the delay processing operation of a quantity required to obtain synchronization with a display video image, and then, causing the speaker 33 to reproduce audio.

As described above, even in the case where the optical disk reproducing apparatus 11 has been used as a relay device, it is possible to automatically identify the fact that the television image receiver 12 is set by a user so as not to be provided for audio reception, and the AV amplifier 13 is set by a user so as not to be provided for video image viewing.

In addition, the digital data outputted from the STB 52 that is a transmitting AV device can be controlled so that a video image displayed by the television image receiver 12 and the audio reproduced by the AV amplifier 13 are synchronized with each other in consideration of a signal delay caused by the optical disk reproducing apparatus 11 serving as a relay device, and the handling by the user can be made very convenient.

While the above description of using the optical disk reproducing apparatus 11 as a relay device has assumed that the HDMI receiving section 63 of the optical disk reproducing apparatus 11 applies a delay processing operation based on control delay data CDL included therein to a digital audio signal, without being limited thereto, a digital audio signal multiplexed with the control delay data CDL is relayed to the AV amplifier 13 as it is so as to apply a delay processing operation based on the control delay data CDL included therein to a digital audio signal by means of the HDMI receiving section 28 of the AV amplifier 13.

In addition, a delay circuit for delaying a digital audio signal applied with a decoding processing operation is incorporated in the STB 52, making it possible to output from the STB 52 a digital audio signal to be delayed by a time that corresponds to a difference between a sum of time information VD3D acquired from the EDID memory 64 of the optical disk reproducing apparatus 11 and a video image processing delay time at the channel selector/decoder section 55 of the STB 52 and a sum of time information AD3D and an audio processing delay time at the channel selector/decoder section 55 of the STB 52.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An audiovisual device comprising:
   a receiving section configured to receive a digital audio signal;
   an audio processing section configured to apply predetermined signal processing operations to the received digital audio signal to reproduce audio;
   a storage section configured to store time information required for the audio signal processing operations at the audio processing section;
   a rewriting section configured to rewrite the stored time information required for the audio signal processing operations into a value that cannot be generally taken when the audiovisual device is set in an audio mute state and restore the value to an original time information required for the audio signal processing operations when the audiovisual device is cleared from the audio mute state; and
   a control section configured to output the stored value that cannot be generally taken when the audiovisual device is set in the audio mute state according to an external requirement for the time information required for the audio signal processing operations and output the stored time information required for the audio signal processing operations when the audio visual device is not set in the audio mute state.

2. The audiovisual device according to claim 1, wherein the control section outputs the time information stored in the storage section upon an external request.

3. The audiovisual device according to claim 1, wherein the receiving section is further configured to receive a digital video signal and to convert the digital audio signal and the digital video signal in a format that conforms to a high definition multimedia interface (HDMI) standard.

4. An audiovisual device according to claim 1, wherein the rewriting section is further configured to receive a digital video signal and to rewrite the stored time information into the value that cannot be generally taken when the audiovisual device is set in a video mute state that further identifies that one or more video images of the digital video signal are not to be displayed on a video display device.

5. The audiovisual device according to claim 4, wherein the audio mute state that identifies that the audio is not to be reproduced by an audio output device.

6. An audiovisual device according to claim 5, wherein the time required for the signal processing operations is a time required for the signal processing operations to reproduce the audio.

7. An audiovisual device according to claim 6 is configured to operate in both the video mute state and the audio mute state.

8. An audiovisual device in communication with a first electronic device, the audiovisual device comprising:
   a transmitter section configured to transmit a digital audio signal; and
   a control section to acquire time information required for audio signal processing operations, wherein when the first electronic device is set in an audio mute state, the time information acquired is a value that cannot be generally taken and when the audio visual device is cleared from the audio mute state, the time information acquired is an original time information required for the audio signal processing operations, and wherein the audio mute state identifies that the first electronic device is not provided for audio reception.

9. An audiovisual device according to claim 8 further comprising a disk reproducing section to apply a predetermined signal processing operation based on the time information received from the control section.

10. An audiovisual device according to claim 9, wherein the predetermined signal processing operation includes delaying the digital audio signal by the difference value in response to determining that the first electronic device has been placed in the audio mute state to denote that audio is being reproduced by another electronic device.

11. An audiovisual device according to claim 8, wherein the control section acquires the time information as a setting from an extended display identification data (EDID) memory.

12. An audiovisual device according to claim 8, wherein the control section acquires the time information stored the first electronic device operating as one of a plurality of electronics devices from a memory of a second electronic device interposed between the audiovisual device and the plurality of electronic devices.

13. An audiovisual device according to claim 12 further comprising a processing section to apply a predetermined signal processing operation to the digital audio signal provided by a third audiovisual device based on information from the control section in response to determining that the first electronic device has been placed in the audio mute state.

14. A method comprising:
   acquire time information from a memory device within a first electronic device of a plurality of electronic devices, the time information being required for signal processing operations, wherein when the first electronic device is set in an audio mute state, the time information is a value that cannot generally be taken and when the first electronic device is cleared from the audio mute state, the time information is restored to an original time information required for the audio signal processing operations, and wherein the audio mute state identifies that the first electronic device is not configured to playback audio associated with an audio signal; and
   controlling the audio signal in order to synchronize a display of a video image at the first electronic device and a second electronic device of the plurality of electronic devices as well as playback of the audio associated with the audio signal at the second electronic device based on the time information.

* * * * *